United States Patent
Keely et al.

(10) Patent No.: US 11,578,816 B2
(45) Date of Patent: Feb. 14, 2023

(54) METHODS AND SYSTEMS FOR MONITORING HEALTH OF A VALVE

(71) Applicant: General Electric Company, Schenectady, NY (US)

(72) Inventors: Bhasker Rao Keely, Bangalore (IN); Aninda Bhattacharya, Bangalore (IN); Ajay Kumar Behera, Bangalore (IN); Shivanand Bhavikatti, Bangalore (IN); Christopher Taylor Herman, Houston, TX (US); Sudipta Mal, Bangalore (IN)

(73) Assignee: VETCO GRAY SCANDINAVIA AS, Stravanger (NO)

( * ) Notice: Subject to any disclaimer, the term of this patent is extended or adjusted under 35 U.S.C. 154(b) by 516 days.

(21) Appl. No.: 16/603,434

(22) PCT Filed: Apr. 6, 2018

(86) PCT No.: PCT/US2018/026438
§ 371 (c)(1),
(2) Date: Oct. 7, 2019

(87) PCT Pub. No.: WO2018/187677
PCT Pub. Date: Oct. 11, 2018

(65) Prior Publication Data
US 2020/0149655 A1 May 14, 2020

(30) Foreign Application Priority Data
Apr. 7, 2017 (IN) .............................. 201741012548

(51) Int. Cl.
*F16K 37/00* (2006.01)
*G01M 3/24* (2006.01)

(52) U.S. Cl.
CPC ...... *F16K 37/0083* (2013.01); *F16K 37/0041* (2013.01); *G01M 3/24* (2013.01)

(58) Field of Classification Search
None
See application file for complete search history.

(56) References Cited

U.S. PATENT DOCUMENTS

| | | | |
|---|---|---|---|
| 5,319,296 A | 6/1994 | Patel | |
| 2005/0126639 A1* | 6/2005 | Ens | F16K 37/0083 137/554 |
| 2005/0257618 A1 | 11/2005 | Boken | |
| 2006/0032535 A1 | 2/2006 | Madden | |
| 2009/0303057 A1 | 12/2009 | Brown | |
| 2009/0306830 A1 | 12/2009 | Cummings | |
| 2014/0182381 A1* | 7/2014 | Comeaux | F16K 37/0075 73/587 |

* cited by examiner

*Primary Examiner* — Paul M. West
*Assistant Examiner* — Mark A Shabman
(74) *Attorney, Agent, or Firm* — Hogan Lovells US LLP (57) ABSTRACT

A method for monitoring health of a valve is presented. The method includes receiving an acoustic emission signal from a sensing device operatively coupled to the valve, selecting a region of interest signal in the acoustic emission signal, determining a plurality of current parameters based on the region of interest signal, and monitoring the health of the valve based on at least the plurality of current parameters, wherein the region of interest signal comprises acoustic emission data generated from initiation of an opening of the valve until the valve is partially opened.

18 Claims, 9 Drawing Sheets

METHODS AND SYSTEMS FOR MONITORING HEALTH OF A VALVE

CROSS REFERENCE TO RELATED APPLICATIONS

This application is a 35 U.S.C. 371 National Stage of International Application No. PCT/US2018/026438, titled "METHODS AND SYSTEMS FOR MONITORING HEALTH OF A VALVE", filed Apr. 2, 2018, which claims priority to India Patent Application No. 201741012548, titled "METHODS AND SYSTEMS FOR MONITORING HEALTH OF A VALVE," filed Apr. 7, 2017, which is incorporated by reference herein in its entirety.

BACKGROUND

Embodiments of the present invention generally relate to a valve and more specifically to methods and systems for monitoring health of the valve.

A valve is a device configured to regulate flow of fluids. The regulation of the fluid flow is facilitated by opening and closing of the valve. Valves may be used in an oil and/or gas production systems to control the flow of oil and/or gas out of a well. Typically, gate valves are used in oil and/or gas production systems. Generally, a gate valve includes a controlled gate that moves up or down against valve seats to permit or prevent the flow of fluid through the gate valve. The working environment for a gate valve can be challenging due to high pressure and temperature of the fluid flow in the oil and/or gas production systems. Specifically, due to compressive forces typically exerted by fluids in the oil and/or gas production systems, surface of gates and valve seats tend to wear and tear. The wear and tear, in turn, may result in large actuating forces, incomplete closing of the valve, and leakage in the valve.

Typically, the wear and tear in the gate valves may lead to safety hazards, and hence health of the gate valve is regularly monitored. Gate valve health monitoring, for example, may include identification of wear and tear in the gate valve, prediction or diagnosis of a leak in the gate valve, identification of presence or absence of lubrication in the gate valve, quantification of amount of leakage in the gate valve, or the like. Current techniques to monitor the health of the gate valve includes manual intervention by experienced technicians at regular intervals. While the valve health is being monitored by the technicians, entire production is typically shut down. Even for monitoring the health of a single gate valve, the entire production system is typically shut down. The time required to manually monitor the valve's health is often long, and the effectiveness of monitoring depends on the experience of technicians. Additionally, current monitoring techniques incur significant costs due to the need to shut down the production system, mobilization of testing equipment and involvement of experienced technicians.

Accordingly, methods and systems are required to automatically monitor the valves.

BRIEF DESCRIPTION

In accordance with one embodiment, a method for monitoring health of a valve is presented. The method includes receiving an acoustic emission signal from a sensing device operatively coupled to the valve, selecting a region of interest signal in the acoustic emission signal, determining a plurality of current parameters based on the region of interest signal, and monitoring the health of the valve based on at least the plurality of current parameters, wherein the region of interest signal comprises acoustic emission data generated from initiation of an opening of the valve until the valve is partially opened.

In accordance with another embodiment, a system for monitoring health of a valve is presented. The system includes a sensing device operatively coupled to the valve and configured to generate an acoustic emission signal, a processing subsystem operationally coupled to the sensing device and configured to receive an acoustic emission signal from the sensing device, select a region of interest signal in the acoustic emission signal, determine a plurality of current parameters based on the region of interest signal, and monitor the health of the valve based on at least the plurality of current parameters, wherein the region of interest signal comprises acoustic emission data generated from initiation of an opening of the valve until the valve is partially opened.

DRAWINGS

These and other features and aspects of embodiments of the present invention will become better understood when the following detailed description is read with reference to the accompanying drawings in which like characters represent like parts throughout the drawings, wherein:

FIG. 11 (B) is a graphical representation of a first derivative signal determined based on the filtered energy signal of FIG. 11(A);

FIG. 11 (C) is a graphical representation of a subset of the first derivative signal of FIG. 11(B)

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions.

Figure 1:
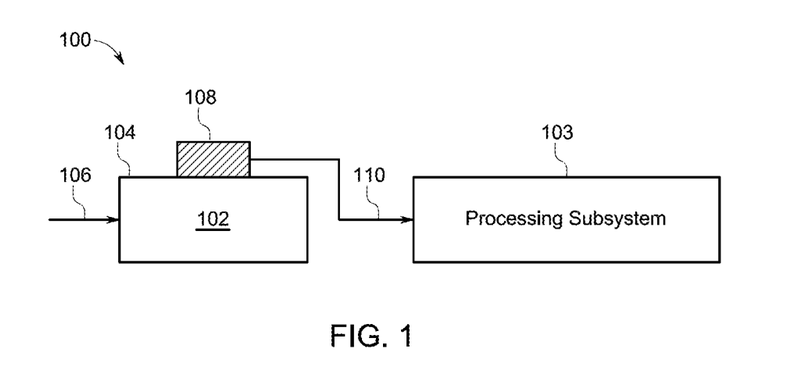
FIG. 1 is a block diagram of a system for monitoring health of a valve, in accordance with certain embodiments of the present system.

FIG. 1 is a block diagram of a system 100 for monitoring health of a valve 102, in accordance with certain embodiments of the present system. The system 100 includes the valve 102 and a processing subsystem 103. In certain embodiments, the valve 102 includes a bonnet 104 that covers and/or holds other components of the valve 102. The valve 102, for example may include a hydraulic actuator, a pneumatic actuator, a manual actuator, or the like. In one embodiment, the valve 102 may be a gate valve. An example of a gate valve is shown with reference to FIG. 3. The valve 102, for example may be a component of a device, such as a Christmas tree. An example of a Christmas tree including multiple valves is shown with reference to FIG. 2. The valve 102 is configured to control flow of a fluid 106. For example, when the valve 102 is a component of the Christmas tree, then the valve 102 controls flow of oil and/or gas out of a well.

A sensing device 108 is disposed on the valve 102. The sensing device 108 is operatively coupled to the valve 102. The sensing device 108, for example may include an acoustic emission sensing device or a piezoelectric transducer. In certain embodiments, the sensing device 108 is disposed on the bonnet 104 of the valve 102. In an embodiment, when the valve 102 is a gate valve, the sensing device 108 may be disposed on at least one of a surface of a gate of the gate valve and a surface of valve seats of the gate valve. An example of a gate valve including the gate and seats is shown with reference to FIG. 3. It is noted that while in the presently contemplated configuration, the system 100 includes the single sensing device 108, in certain embodiments, the system 100 may include multiple sensing devices. The sensing device 108 is configured to measure high frequency surface stress wave characteristics of the valve 102, and generate acoustic emission signals 110 representative of the high frequency surface stress wave characteristics.

As previously noted, the system 100 further includes the processing subsystem 103. The processing subsystem 103 is operationally coupled to the sensing device 108 and is configured to receive the acoustic emission signals 110 from the sensing device 108. In one embodiment, the processing subsystem 103 is coupled to the sensing device 108 by a wired medium. In another embodiment, the processing subsystem 103 is coupled to the sensing device 108 by a wireless medium. Furthermore, the processing subsystem 103 is configured to monitor the health of the valve 102 based on the acoustic emission signals 110. Particularly, the processing subsystem 103 is configured to predict or detect one or more faults present in the valve 102. For example, the processing subsystem 103 may determine a lubrication condition of the valve 102, a leakage in the valve 102, an amount of leakage in the valve 102, and a location of leakage in the valve 102. A method of monitoring the health of the valve 102 by the processing subsystem 103 is explained in greater detail with reference to FIG. 4 and FIG. 6.

In one embodiment, the system 100 may include multiple processing subsystems, and tasks of the processing subsystem 103 may be divided amongst the multiple processing subsystems or redundantly executed by two or more of the multiple processing subsystems. In one embodiment, the processing subsystem 103 may be located at a remote location from the location of the sensing device 108. In another embodiment, the processing subsystem 103 may be located adjacent to the location of the sensing device 108. The processing subsystem 103 may include at least one arithmetic logic unit, microprocessor, general purpose controller or other processor arrays configured to perform computations, and/or retrieve data stored in memory and/or a data repository. In one embodiment, the processing subsystem 103 may be a multiple core processor. The processing subsystem 103 processes data signals and may include various computing architectures including a complex instruction set computer (CISC) architecture, a reduced instruction set computer (RISC) architecture, or an architecture implementing a combination of instruction sets. In one embodiment, the processing capability of the processing subsystem 103 may support the retrieval of data and transmission of data. In another embodiment, the processing capability of the processing subsystem 103 may also perform more complex tasks, including various types of feature extraction, modulating, encoding, multiplexing, and the like. Use of other types of processing subsystems, operating systems, and physical configurations is also envisioned.

Figure 2:
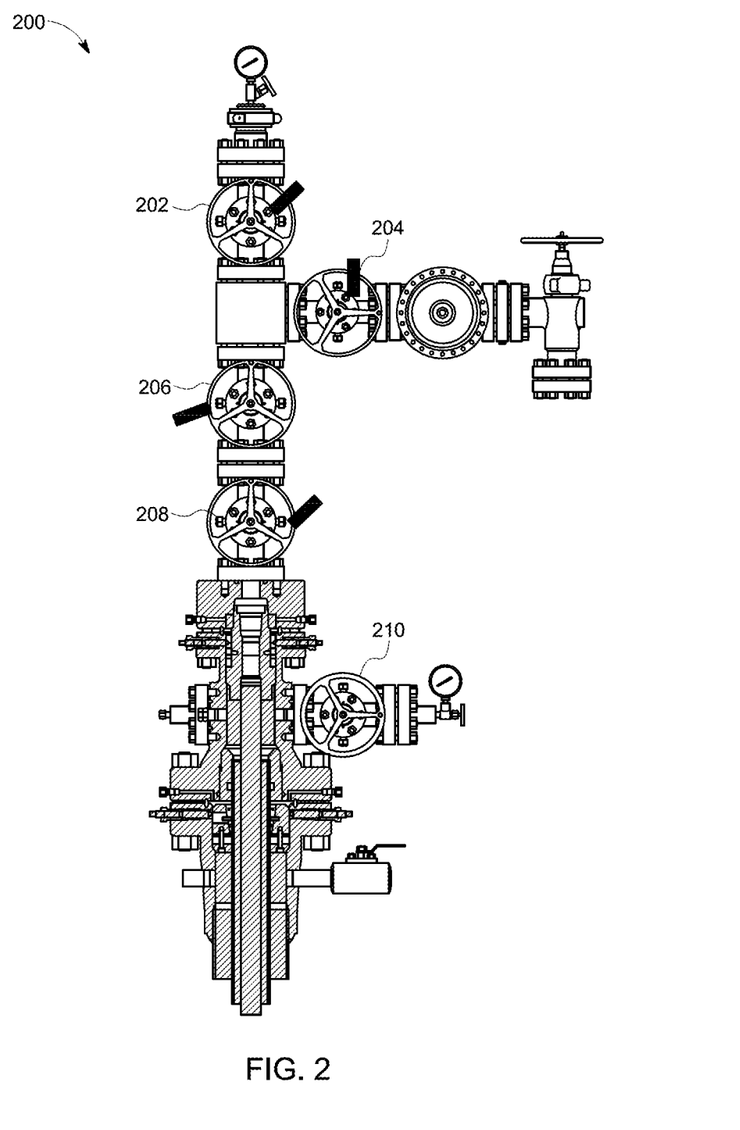
FIG. 2 is a diagrammatic illustration of a Christmas tree including multiple valves.

FIG. 2 is a diagrammatic illustration of a Christmas tree 200, which is an assembly of valves including multiple valves 202, 204, 206, 208, 210. The Christmas tree 200, for example may be used in controlling a flow of fluids, such as oil and gas in or out of a well. In a non-limiting example, the multiple valves 202, 204, 206, 208, 210 may be gate valves. An example of a gate valve is shown with reference to FIG. 3. In certain embodiments, the valves 202, 204, 206, 208, 210 are manual valves that are manually operated. In alternative embodiments, the valves 202, 204, 206, 208, 210 may be operated by an actuator. Health of one or more of the valves 202, 204, 206, 208, 210 may be monitored using a system of the present specification, such as the system 100 of FIG. 1.

Figure 3:
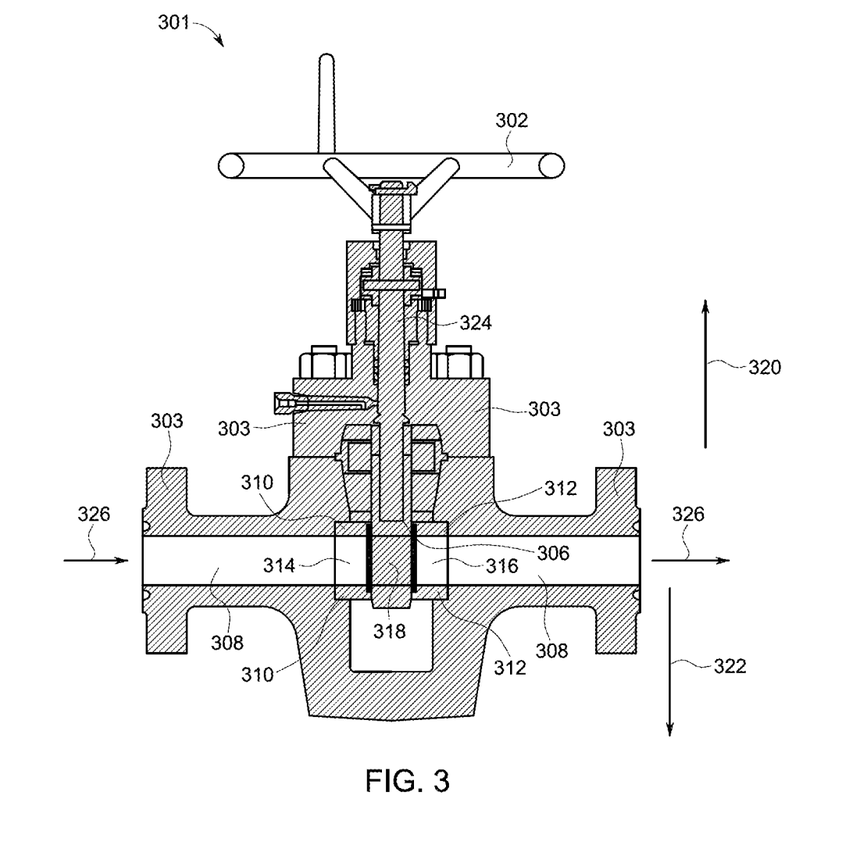
FIG. 3 is a cross-section of a gate valve, in accordance with certain embodiments of the present system.

FIG. 3 is a cross-sectional view of a gate valve 301, in accordance with certain embodiments of the present system. The gate valve 301, for example may be the gate valve 102 referred to in FIG. 1. In certain embodiments, the gate valve 301 includes a handle 302 for opening and closing the valve 301, and hence is a manually operated valve. In alternative embodiments, the gate valve 301 may be an automated valve. The valve 301 further includes a bonnet 303 and a gate 306. The bonnet 303 includes a fluid pathway 308 and a plurality of seats 310, 312. The seats 310, 312 are fixedly mounted within the bonnet 303. In certain embodiments, the seats 310, 312 are ring shaped. The seats 310 and 312 include bores 314 and 316, respectively.

The gate 306 includes a bore 318, and is movably mounted within the bonnet 303. The gate 306 may be controlled to move in an upward direction 320 and a downward direction 322. The movement of the gate 306 in the upward direction 320 or the downward direction 322 aligns or misaligns the bores 314, 316 of the seats 310, 312 to the bore 318 of the gate 306. The alignment of the bore 318 of the gate 306 to the bores 314, 316 opens the valve 301, and allows a fluid 326 to pass through the valve 301. In the presently contemplated configuration, the valve 301 is open as the bore 318 of the gate 306 is aligned with the bores 314, 316 of the seats 310, 312. In one embodiment, the movement of the gate 306 in the upward direction 320 may misalign the bore 318 of the gate 306 to the bores 314, 316 of the seats 310, 312. The misalignment may either include partial overlap or zero overlap of the bore 318 to the bores 314, 316. A diagrammatic illustration of full alignment, partial alignment and zero alignment of the bore 318 to the bores 314, 316 is shown in FIG. 5. Accordingly, based on the overlap of the bore 318 to the bores 314, 316, the valve 301 may be open, partially open, partially closed or closed. It is noted that the terms "partially open" and "partially closed" may be used interchangeably. As used herein, the term "partially open" refers to a position of the valve 301 when the bore 318 is not axially aligned to the bores 314, 316 and the valve 301 is not closed. Further, as used herein, the term "closed" refers to a position of the valve 301 when the bore 318 is axially aligned to the bores 314, 316.

The valve 301 additionally includes a stem 324 operationally coupled to the handle 302 and the gate 306. A rotation of the handle 302 results in a movement of the stem 324 and the movement of the gate 306. For example, based on a direction of rotation of the handle 302, the stem 324 and the gate 306 may be moved in the upward direction 320 or the downward direction 322.

Figure 4:
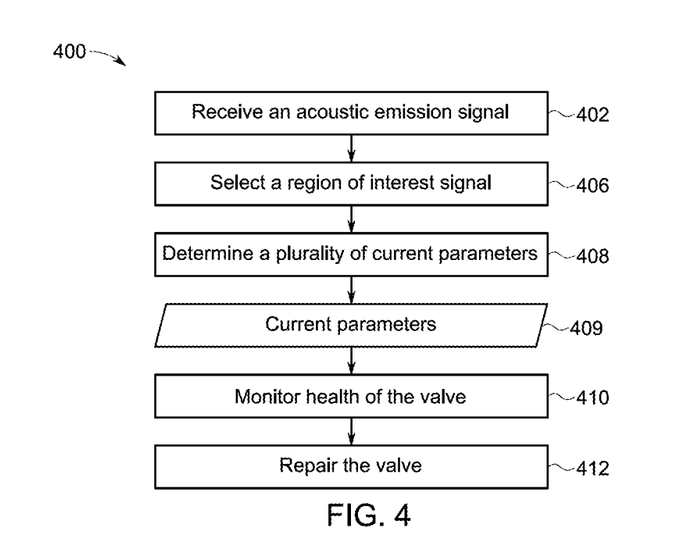
FIG. 4 is a flow chart illustrating a method for monitoring health of a valve, in accordance with certain embodiments of the present method.

FIG. 4 is a flow chart illustrating a method 400 for monitoring health of a valve, in accordance with certain embodiments of the present method. For ease of understanding the method 400 will be explained with reference to the valve 102 of FIG. 1 and the valve 301 FIG. 3. However, method 400 should not be restricted to the valves 102, 301. Particularly, the method 400 should not be restricted to the structure, type, function and components of the valves 102, 301. The method 400, for example, may be executed by the processing subsystem 103. At block 402, an acoustic emission signal may be received by a processing subsystem. The acoustic emission signal, for example may be the acoustic emission signal 110 generated by the sensing device 108 in FIG. 1. Furthermore, the processing subsystem may be the processing subsystem 103 of FIG. 1.

At block 406, a region of interest signal may be selected from the acoustic emission signal. In certain embodiments, the region of interest signal, for example may be selected based on the acoustic emission signal. In one embodiment, the region of interest signal refers to a portion of the acoustic emission signal generated from initiation of the opening of the valve 301 until the valve 301 is partially opened. Hence, the region of interest signal includes acoustic emission data generated from initiation of the opening of the valve 301 until the valve 301 is partially opened. In one embodiment, the region of interest signal includes acoustic emission data generated while the bore 318 is in contact with an outer surface/periphery of one or both the seats 310, 312 until the valve 301 is about 1% to about 20% open. In another embodiment, the region of interest signal includes acoustic emission data generated while the gate 306 is loaded and continues until the gate 306 is unloaded. In still another embodiment, the region of interest refers to a portion of the acoustic emission signal generated during a time period between a starting time stamp until an ending time stamp. As used herein, the term "starting time stamp" refers to a time instance when the stem 324 of the valve 301 starts moving during a loaded condition of the valve 301. Furthermore, the term "ending time stamp" refers to a time instance when the valve 301 is unloaded. In still another embodiment, the ending time stamp refers to a time instance when a pressure of the fluid 326 in an upstream line equalizes to a pressure of the fluid 326 in a downstream line of the valve 301. An example where the bore 318 is in contact with the outer surface/periphery of one or both the seats 310, 312, and another example where the valve 301 is about 20% open are shown in FIG. 5.

At block 408, a plurality of current parameters 409 may be determined based on the region of interest signal. The current parameters 409, for example may include at least one of an acoustic emission energy signal, acoustic emission counts, an acoustic emission root mean square, a maximum amplitude, an acoustic emission average signal level and a rise time. Hereinafter, the term "acoustic emission energy signal" is referred to as an "energy signal". As used herein, the term "acoustic emission count" refers to number of times the acoustic emission data in the region of interest signal exceeds a determined threshold. The energy signal may be determined using the following equation (1):

$$E = T \sum_{n=0}^{N-1} x^2[n] \quad (1)$$

where E is the energy signal, T is a duration of the region of interest signal or a duration between the starting time stamp and the ending time stamp, x[n] denotes discrete samples of the region of interest signal, n is a count of an acoustic emission data point, and N is a total of number of acoustic emission data points in the region of interest signal.

At block 410, the health of the valve 301 may be monitored based on the current parameters 409. Monitoring of the health, for example may include monitoring a lubrication condition of the valve 301, presence or absence of leakage in the valve 301, an amount of leakage in the valve 301, and a location of leakage in the valve 301. Monitoring the health of the valve 301 based on the current parameters 409 is explained in greater detail with reference to FIG. 6. Furthermore, at block 412, the valve 301 may be repaired if a defect is identified while monitoring the valve 301.

FIG. 5(A), FIG. 5(B), FIG. 5(C) and FIG. 5(D) represent diagrammatic illustrations 502, 504, 506, 508, respectively, of a gate of a valve and multiple seats for describing a region of interest signal, in accordance with an embodiment of the present system. For ease of understanding, FIG. 5(A), FIG. 5(B), FIG. 5(C) and FIG. 5(D) are explained with reference to FIG. 3. As previously noted, with reference to FIG. 3, reference numeral 318 refers to a bore in the gate 306, and reference numerals 310, 312 refer to seats fixedly coupled to the bonnet 303 (not shown in FIG. 5(A), FIG. 5(B), FIG. 5(C) and FIG. 5(D)). As previously noted with reference to FIG. 3, the seat 310 includes the bore 314 and the seat 312 includes the bore 316. Since the seats 310, 312 are axially aligned, the bore 314 of the seat 310 overlaps the bore 318 of the seat 312.

Figure 5A:
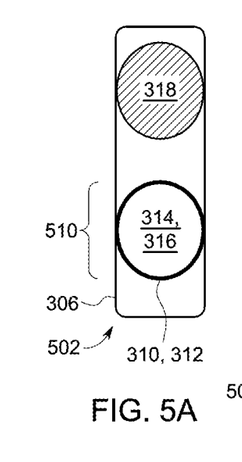
FIGS. 5(A)-5(D) represent diagrammatic illustrations of a gate of a valve and multiple seats for describing a region of interest signal, in accordance with an embodiment of the present system.
Figures 5B, 5C:
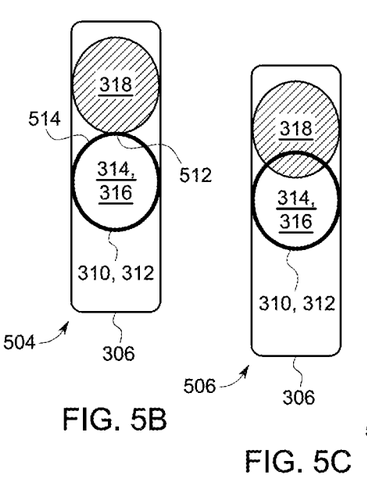
Figure 5D:
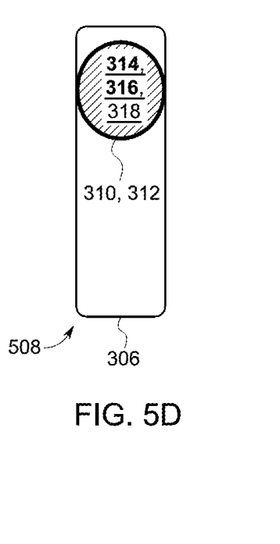

FIG. 5(A) shows a first closed position 502 of the gate 306. FIG. 5(B) shows a second closed position 504 of the gate 306. FIG. 5(C) shows a third partially open position 506 of the gate 306, and FIG. 5(D) shows a fourth open position 508 of the gate 306. In the first closed position 502, the gate 306 is in a position where the valve 301 is non-operational and/or closed. In the first closed position 502, a portion 510 of the gate 306 not having a bore overlaps the seats 310, 312, hence the valve 301 is closed. In the second closed position 504 of the gate 306, the gate 306 moved in the downward direction 322, and the valve 301 initiates opening. Particularly, in the second closed position 504 of the gate 306, an edge 512 of the bore 318 in the gate 306 of the valve 301 is in contact with outer edges 514 of the seats 310, 312 of the valve 301.

Reference numeral 506 shows the third partially open position of the valve 301. In the third partially open position 506, the bore 318 partially overlaps the bores 314, 316 of the seats 310, 312. Due to the partial overlap of the bore 318 to the bores 314, 316, the valve 301 is partially open. Reference numeral 508 is representative of the open position of the valve 301. In the open position 508 of the valve 301, the circumference of the bore 318 overlaps the circumferences of the bores 314, 316. In the open position, the bore 318 are axially aligned to the bores 314, 316. In one embodiment, the region of interest signal is a portion of the acoustic emission signal generated during the time duration when the gate 306 moves from the second closed position 504 to the open position 508.

Figure 6:
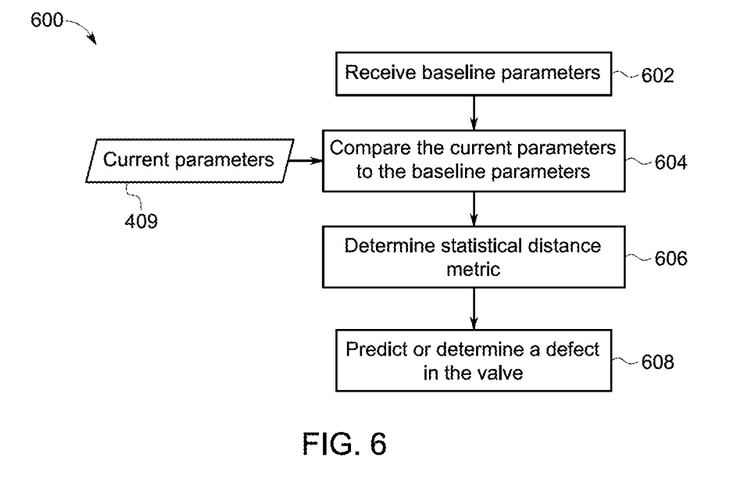
FIG. 6 is a flow chart illustrating a method for predicting or determining a defect in a valve, in accordance with certain embodiments of the present system.

FIG. 6 is a flow chart illustrating a method 600 for predicting or determining a defect in a valve, in accordance with certain embodiments of the present method. Particularly, FIG. 6 explains block 410 of FIG. 4 in greater detail. The valve, for example may be the valves 102 and 301 of FIG. 1 and FIG. 3, respectively. The method 600, for example may be executed by the processing subsystem 103. At block 602, baseline parameters may be received by the processing subsystem 103. The baseline parameters, for example may be received from a data repository. As used herein, the term "baseline parameters" refers to parameters determined based on acoustic emission signals generated while the valve 102 is in an ideal health, and is not characterized by a defect or fault. The baseline parameters, for example include at least one of an acoustic emission energy, acoustic emission counts, an acoustic emission root mean square, a maximum amplitude, acoustic emission average signal level and a rise time. At block 604, the current parameters 409 (generated at block 408 of FIG. 4) may be compared to one or more of the baseline parameters. For example, the current acoustic emission peak burst amplitude may be compared to a baseline acoustic emission peak burst amplitude.

Furthermore, at block 606, a statistical distance metric may be determined based on the current parameters 409 and the baseline parameters. The statistical distance metric, for example may include a Mahalanobis distance, a Manhattan distance, a Euclidean distance, a Correlation Distance, or the like. For example, at block 606 a Mahalanobis distance of the current parameters 409 from the baseline parameters may be determined. At block 608, a defect in the valve 102 may be predicted or determined based on the comparison of the current parameters 409 to the baseline parameters and/or the statistical distance metric. In one embodiment, when a current parameter exceeds a corresponding baseline parameter, then the processing subsystem 103 may affirm presence of a defect in the valve 102. For example, when the current acoustic emission peak burst amplitude exceeds baseline acoustic emission peak burst amplitude, the processing subsystem 103 may affirm leakage in the valve 102.

In another embodiment, when the statistical distance metric, such as the Mahalanobis distance is greater than a determined statistical distance threshold, then the processing subsystem 103 may identify a lubricant deficiency defect in the valve 102. The determined statistical distance threshold may be predetermined, and may be stored in the data repository at the time of commissioning, or during overhauling operation of the valve 102.

Figure 7:
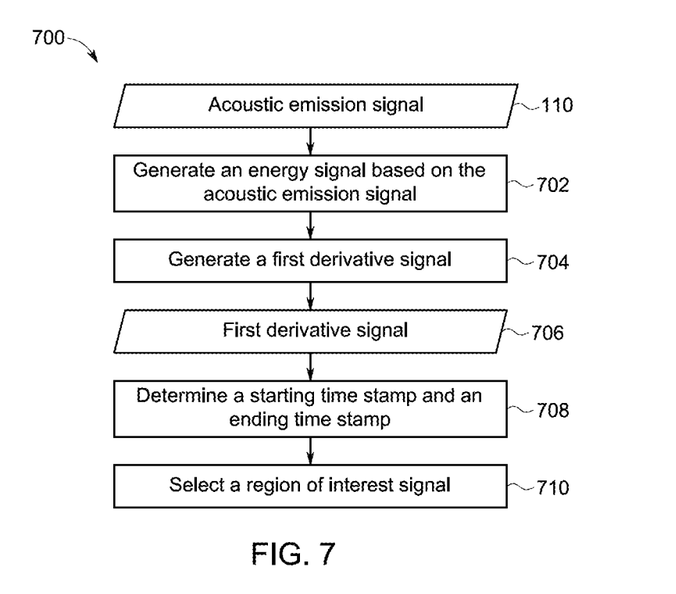
FIG. 7 is a flow chart illustrating a method for selecting a region of interest signal, in accordance with certain embodiments of the present method.

FIG. 7 is a flow chart illustrating a method 700 for selecting a region of interest signal, in accordance with certain embodiments of the present method. Particularly, FIG. 7 explains block 406 of FIG. 4 in greater detail. The method 700 may be executed by the processing subsystem 103. For ease of understanding, FIG. 7 is explained with reference to the valve 301 and the acoustic emission signal 110 of FIG. 1. At block 702, an energy signal may be generated based on the acoustic emission signal 110. The energy signal, for example may be generated by applying the equation (1) on the acoustic emission signal 110. Further, optionally, the generated energy signal may be a filtered energy signal that is generated after filtering out noise signals from the energy signal.

At block 704 a first derivate signal 706 may be determined based on the energy signal or the filtered energy signal. For example, the first derivative signal 706 may be determined by determining a first derivative of the energy signal or the filtered energy signal. Furthermore, at block 708 a starting time stamp and an ending time stamp may be determined. The starting time stamp and the ending time stamp, for example may be determined based on the first derivative signal 706. The starting time stamp refers to a time stamp when gate 306 is at the second closed position 504 shown in FIG. 5(B) such that the opening of the valve 301 is initiated. Further, the ending time stamp may be a time stamp when the bore 318 in the gate 306 partially overlaps with the bores 314, 316 in the seats 310, 312. For example, the ending time stamp is a time stamp when the gate 306 is at the third partially open position 506. Determination of the ending time stamp is explained in detail with reference to FIG. 8. Furthermore, determination of the starting time stamp is explained in detail with reference to FIG. 9.

Subsequently at block 710, a region of interest signal may be selected based on the starting time stamp, the ending time stamp and the acoustic emission signal 110. Particularly, the region of interest signal may be selected by selecting a portion of the acoustic emission signal 110 that starts at the starting time stamp and ends at the ending time stamp. In other words, the region of interest signal may be selected by extracting acoustic emission data points, from the acoustic emission signal 110 between the starting time stamp and the ending time stamp.

Figure 8:
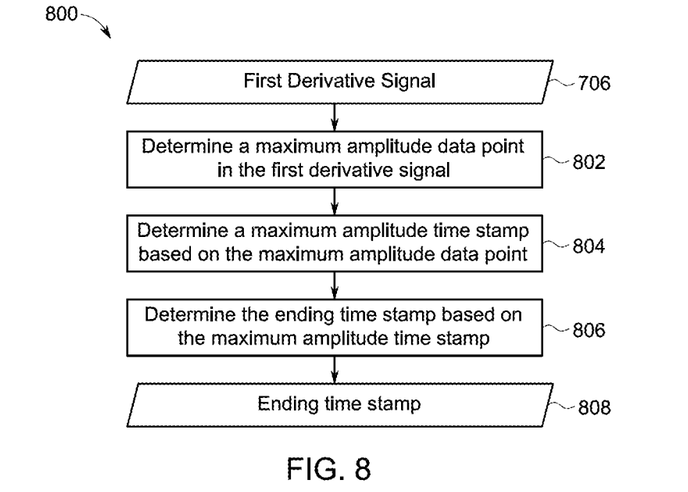
FIG. 8 is a flow chart illustrating a method for determining an ending time stamp, in accordance with certain embodiments of the present method.

FIG. 8 is a flow chart illustrating a method 800 for determining an ending time stamp 808, in accordance with certain embodiments of the present method. Particularly, FIG. 8 explains a portion of block 708 of FIG. 7 in greater detail. At block 802, a maximum amplitude data point in the first derivative signal 706 may be determined. At block 804, the maximum amplitude data point corresponding to the maximum amplitude time stamp may be determined. Furthermore, at block 806, the ending time stamp 808 may be determined based on the maximum amplitude time stamp. Particularly, the maximum amplitude time stamp may be identified as the ending time stamp 808.

Figure 9:
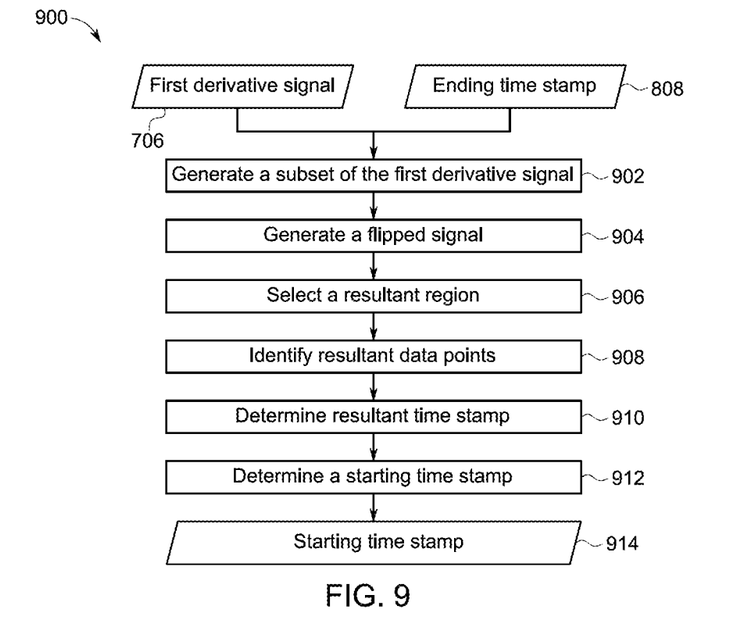
FIG. 9 is a flow chart illustrating a method for determining a starting time stamp, in accordance with certain embodiments of the present method.

FIG. 9 is a flow chart illustrating a method 900 for determining a starting time stamp 914, in accordance with certain embodiments of the present method. Particularly, FIG. 9 explains a portion of block 708 of FIG. 7 in greater detail. At block 902, a subset of the first derivative signal 706 may be generated. The subset of the first derivative signal 706, for example may be generated by selecting a portion of the signal that exists between the starting and ending time stamps 808. Subsequently at block 904, a flipped signal may be generated based on the subset of the first derivative signal 706. The flipped signal, for example may be generated by generating a mirror image of the subset of the first derivative signal 706.

Furthermore, at block 906 a resultant region may be selected from the flipped signal. The resultant region is selected by iteratively determining overlapped regions based on the flipped signal. The determination of the resultant region and the overlapped region is explained in greater detail with reference to FIG. 10. Subsequently at block 908, data points may be identified in the resultant region. Hereinafter, the data points in the resultant region shall be referred to as "resultant data points."

Moreover, at block 910, a resultant time stamp may be determined based on the resultant data points. The resultant time stamp is a time stamp corresponding to one of the resultant data points. For example, the resultant time stamp may be determined by selecting one of the resultant data points, and equating a time stamp corresponding to the selected resultant data point as the resultant time stamp. At block 912, the resultant time stamp may be identified as the starting time stamp.

Figure 10:
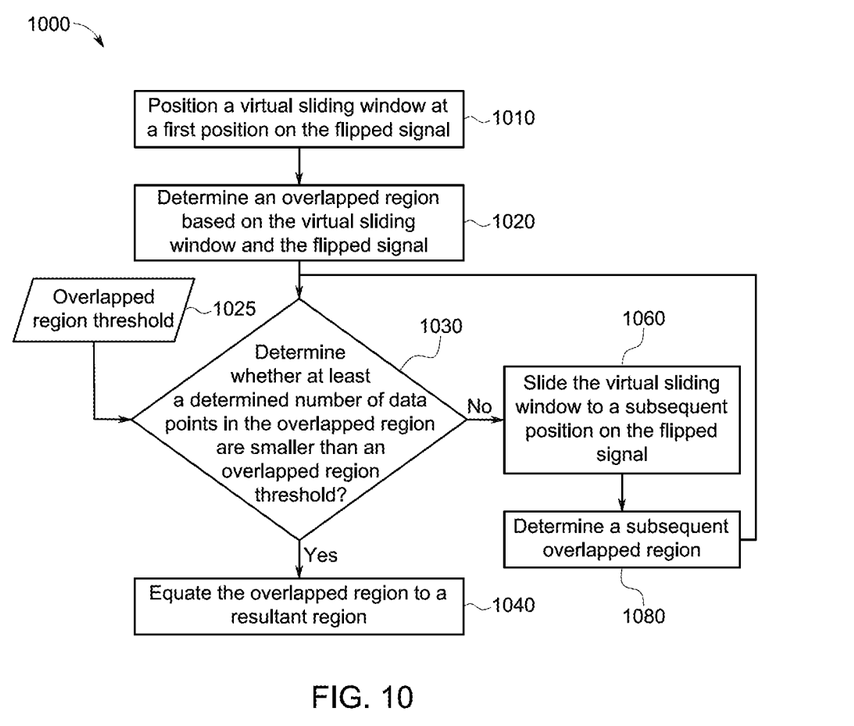
FIG. 10 is a flow chart illustrating a method for selecting a resultant region, in accordance with certain embodiments of the present method.

FIG. 10 is a flow chart illustrating a method 1000 for selecting a resultant region, in accordance with certain embodiments of the present method. Particularly, FIG. 10 explains block 906 of FIG. 9 in greater detail. The method 1000 may be executed by the processing subsystem 103 of FIG. 1. At block 1010, a virtual sliding window may be positioned at a first position on a flipped signal. The flipped signal, for example may be the flipped signal generated at block 904 of FIG. 9. As used herein, the term "virtual sliding window" refers to a mathematical function that is zero-valued outside of a determined time period. The virtual sliding window is characterized by the determined time period. In one embodiment, the virtual sliding window may be positioned at the starting of the flipped signal. In another embodiment, the virtual window may be positioned randomly on the flipped signal.

At block 1020, an overlapped region on the flipped signal may be determined based on the virtual sliding window and the flipped signal. Particularly, the overlapped region includes data points of the flipped signal that overlap with the virtual sliding window. Furthermore, at block 1030 a check is carried out to determine whether at least a determined number of data points in the overlapped region are below or smaller than a determined overlapped region threshold 1025. The determined overlapped region threshold 1025, for example may be retrieved from a data repository. In one embodiment, the determined overlapped region threshold 1025 may be stored in the data repository at the time of commissioning of the system 100 or the processing subsystem 103. By way of a non-limiting example, the overlapped region threshold may be equal to one-third of a value of the region of interest signal (see block 710 in FIG. 7) selected from the energy signal (see block 702 of FIG. 7). By way of a non-limiting example, the determined overlapped region threshold 1025 may be determined based on acoustic emission signals generated when the valve 102 or the valve 301 is operating in an ideal mode without defects. At block 1030, when it is determined that at least the determined number of data points are below the determined overlapped region threshold 1025, then the control is transferred to block 1040. At block 1040, the overlapped region may be equated to the resultant region.

Referring back to block 1030, if it is determined that at least the determined number of data points in the overlapped region are not smaller than or equal to the determined overlapped region threshold 1025, then the control is transferred to block 1060. At block 1060, the virtual sliding window is moved to a subsequent position. In one embodiment, the subsequent position is selected such that at least one data point in the previous position of the virtual sliding window does not exist in the subsequent position of the virtual sliding window. In another embodiment, the subsequent position is selected such that there is no overlapping or common data points between the previous position of the virtual sliding window and the subsequent position of the virtual sliding window.

At block 1080, a subsequent overlapped region may be determined based on the subsequent position of the virtual sliding window on the flipped signal. Subsequently, the control is transferred back to block 1030. At block 1030, a check is carried out to determine whether at least a determined number of data points in the subsequent overlapped region are below the determined overlapped region threshold 1025. At block 1030, if it is determined that number of data points in the subsequent overlapped region are smaller than the determined overlapped region threshold 1025, then the control is transferred to block 1040, and the subsequent overlapped region is selected as the resultant region. However, at block 1030, if it is determined that the number of data points in the subsequent overlapped region is not smaller than the determined overlapped region threshold 1025, then the control is transferred to block 1040. Accordingly, blocks 1030, 1060 and 1080 are iteratively executed until the determined number of data points in the overlapped region are smaller than the determined overlapped region threshold 1025. In particular, the virtual sliding window is iteratively slid to a subsequent position on the flipped signal, and the subsequent overlapped region is iteratively determined until number of data points in the overlapped region are smaller than the determined overlapped region threshold 1025.

Figure 11A:
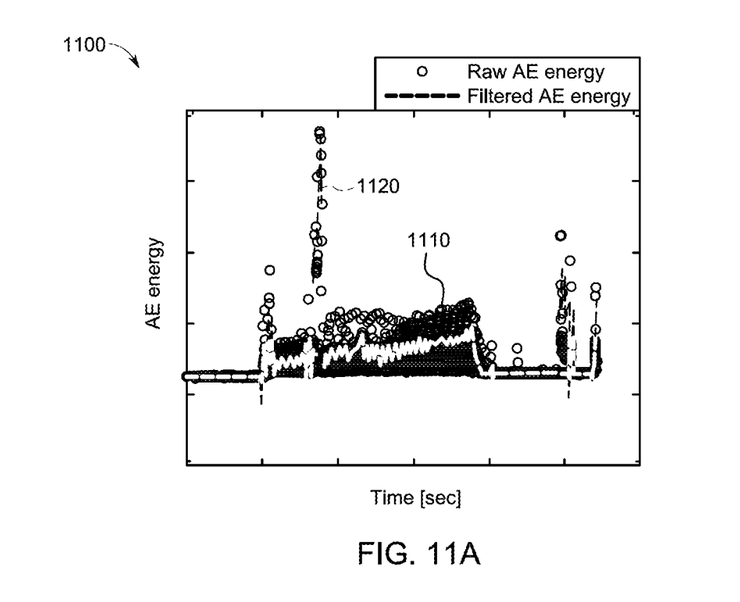
FIG. 11(A) is a graphical representation of an energy signal and a filtered energy signal.
Figure 11B:
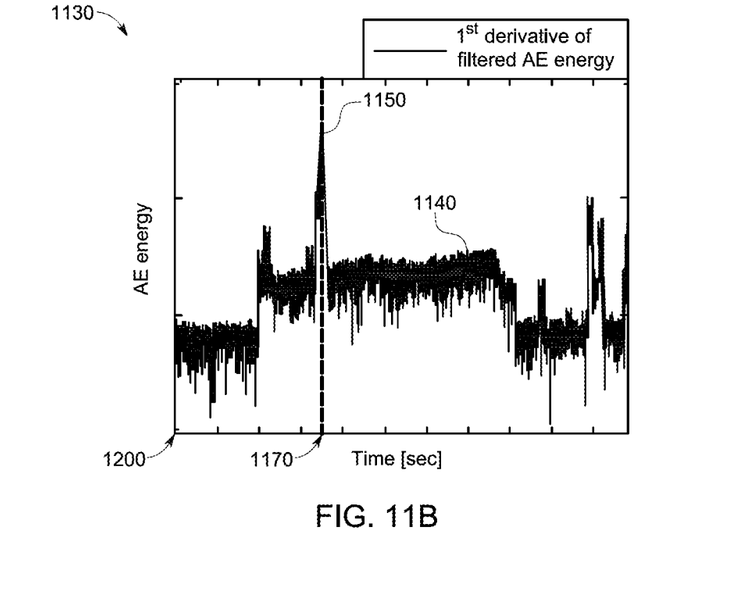

FIG. 11(A) is a graphical representation 1100 of an energy signal 1110 and a filtered energy signal 1120. The energy signal 1110 is a signal determined based on an acoustic emission signal, such as the acoustic emission signal 110. The energy signal 1110, for example may be the energy signal generated at block 702 of FIG. 7. Furthermore, the filtered energy signal 1120 is generated by filtering the energy signal 1110.

FIG. 11 (B) is a graphical representation 1130 of a first derivative signal 1140 determined based on the filtered energy signal 1120 of FIG. 11(A). The first derivative signal 1140, for example may be the first derivative signal 706 of FIG. 7. As previously noted with reference to FIG. 7, the first derivative signal 1140 is generated by determining a first derivative of the energy signal 1110 or the filtered energy signal 1120.

Figure 11C:
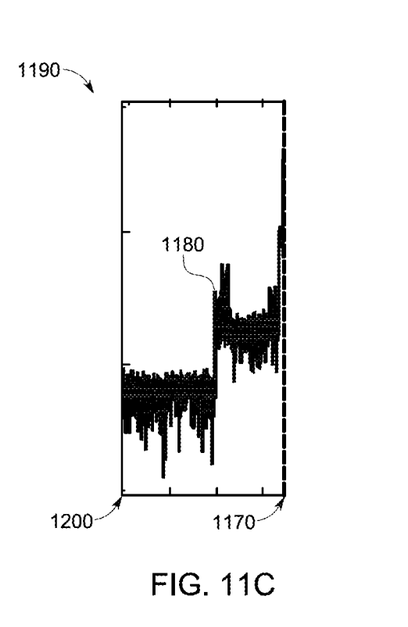
Figure 11D:
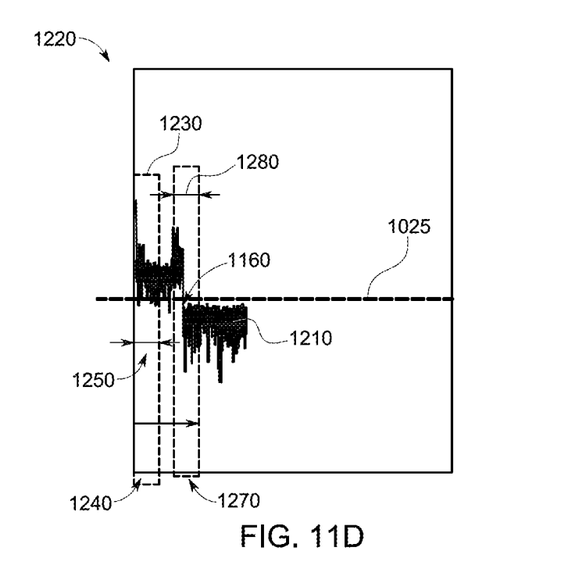
FIG. 11(D) is a graphical representation of a flipped signal determined based on the subset of the first derivative signal of FIG. 11(C).

As previously noted with reference to block 708 of FIG. 7, a starting time stamp 1160 (shown in FIG. 11(D)) and an ending time stamp 1170 may be determined based on the first derivative signal 1140. For determining the ending time stamp 1170, the processing subsystem 103 may execute the following steps: The processing subsystem 103 may determine a maximum amplitude data point 1150 in the first derivative signal 1140. Subsequently, the processing subsystem 103 may determine a maximum amplitude time stamp 1170 corresponding to the maximum amplitude data point 1150 in the first derivative signal 1140. Furthermore, the processing subsystem 103 may select the maximum amplitude time stamp 1170 as the ending time stamp 1170.

Furthermore, for determining the starting time stamp 1160, a subset 1180 (shown in FIG. 11(C)) of the first derivative signal 1140 may be selected. FIG. 11 (C) is a graphical representation 1190 of a subset 1180 of the first derivative signal 1140 of FIG. 11(B). The subset 1180 of the first derivative signal 1140 is chosen from a starting point 1200 of the first derivative signal 1140 until the ending time stamp 1170. Subsequent to the selection of the subset 1180 of the first derivative signal 1140, a flipped signal 1210 (shown in FIG. 11(D)) is generated. FIG. 11(D) is a graphical representation 1220 of a flipped signal 1210 generated based on the subset 1180 of the first derivative signal 1140 of FIG. 11(C). The flipped signal 1210 is generated using a mirror image of the subset 1180 of the first derivative signal 1140. A virtual sliding window 1230 is positioned on the flipped signal 1210. In certain embodiments, the first position of the virtual sliding window 1230 is a starting point 1240 of the flipped signal 1210. An overlapped region 1250 is determined by positioning the virtual sliding window 1230 on the flipped signal 1210. As shown in FIG. 11(D), the overlapped region 1250 includes a subset of data points of the flipped signal 1210. The data points in the overlapped region 1250 may be compared to the determined overlapped region threshold 1025 (also see FIG. 10). As shown in FIG. 11(D), none of the data points in the overlapped region is smaller than the determined overlapped region threshold 1025. Hence, the processing subsystem 103 may iteratively slide the virtual sliding window 1230 to subsequent positions resulting in generation of subsequent overlapped regions. As previously noted with reference to FIG. 10, the processing subsystem 103 may slide the virtual sliding window until at least a determined number of the data points in subsequent overlapped region is smaller than the determined overlapped region threshold 1025. In certain embodiments, when the virtual sliding window 1230 is moved at a subsequent position 1270, a subsequent overlapped region 1280 is determined. As shown in FIG. 11(D), in the subsequent overlapped region 1280, a plurality of data points are smaller than the determined overlapped region threshold 1025. Hence, the processing subsystem may identify the subsequent overlapped region 1280 as a resultant region 1280, and data points in the resultant region 1280 are chosen as resultant data points. The processing subsystem 103 may further choose a time stamp corresponding to one of the resultant data points as the starting time stamp 1160.

The present systems and methods monitor the health of a valve with minimal human intervention. The present systems and methods extract acoustic emission data that is relevant for determining a defect or wear and tear of the valve. For example, the present systems and methods extract region of interest signals from acoustic emission signals generated by sensors installed on the valve. Subsequently, a defect or wear and tear in the valve may be determined by processing the region of interest signals. The region of interest signals provide information about defect due to presence of data related to a rub present between a gate surface and downstream seat surface of the valve at the time of generation of the region of interest signals. Hence, the usage of the region of interest signals for monitoring the health of the valve positively contributes to the sensitivity and accuracy of the present systems and methods. The present systems and methods predict potential defects in the valve, and hence overhauling requirements may be planned, and downtime of production systems may be reduced. Furthermore, since the present systems and methods monitor a health of the valve without or minimal human intervention, the possibility of errors is minimized Additionally, the present systems and methods reduces significant costs by saving on downtimes of the production system, mobilization of testing equipment and involvement of experienced technicians.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method for monitoring health of a valve, comprising:
receiving an acoustic emission signal from a sensing device operatively coupled to the valve;
selecting a region of interest signal in the acoustic emission signal, wherein the region of interest signal comprises acoustic emission data generated from initiation of an opening of the valve until the valve is partially opened, wherein selecting the region of interest signal comprises:
determining an energy signal based on the acoustic emission signal;
determining a first derivative of the energy signal to generate a first derivative signal;
determining a starting time stamp and an ending time stamp based on the first derivative signal; and
selecting the region of interest signal based on the starting time stamp and the ending time stamp,
wherein the region of interest signal is characterized by the starting time stamp and the ending time stamp;
determining a plurality of current parameters based on the region of interest signal;
monitoring the health of the valve based on at least the plurality of current parameters; and
determining whether the valve needs repair when a defect is identified while monitoring the health of the valve.

2. The method of claim 1, wherein determining the plurality of current parameters comprises determining at least one of an acoustic emission energy, acoustic emission counts, an acoustic emission root mean square, a maximum amplitude, an acoustic emission average signal level, and a rise time.

3. The method of claim 1, wherein monitoring the health of the valve comprises:
receiving a plurality of baseline parameters;
determining a statistical distance metric of the plurality of current parameters from the plurality of baseline parameters; and
monitoring the health of the valve based on a comparison of the statistical distance metric and a determined statistical distance threshold.

4. The method of claim 3, wherein monitoring the health of the valve comprises determining a lubrication condition of the valve based on the comparison of the statistical distance metric and the determined statistical distance threshold.

5. The method of claim 1, wherein the opening of the valve is initiated when an outer edge of a bore in a gate of the valve is in contact with outer edges of seats of the valve.

6. The method of claim 1, wherein the valve is partially opened when the valve is characterized by 1% to 20% opening.

7. The method of claim 1, wherein selecting the region of interest signal comprises selecting acoustic emission data points between the starting time stamp and the ending time stamp.

8. The method of claim 1, wherein the starting time stamp corresponds to a time stamp when the opening of the valve is initiated.

9. The method of claim 1, wherein the ending time stamp corresponds to a time stamp when the valve is 1% to 20% open.

10. The method of claim 1, wherein determining the ending time stamp comprises:
   determining a maximum amplitude data point in the first derivative signal;
   determining a maximum amplitude time stamp corresponding to the maximum amplitude data point; and
   equating the maximum amplitude time stamp to the ending time stamp to generate the ending time stamp.

11. The method of claim 1, wherein determining the starting time stamp comprises:
   generating a subset of the first derivative signal based on the first derivative signal and the ending time stamp;
   generating a mirror image of the subset of the first derivative signal to generate a flipped signal;
   selecting a resultant region in the flipped signal by iteratively determining overlapped regions on the flipped signal;
   identifying resultant data points in the resultant region;
   determining a resultant time stamp corresponding to one of the resultant data points; and
   equating the resultant time stamp to the starting time stamp.

12. The method of claim 11, wherein selecting the resultant region comprises:
   position a virtual sliding window at a first position on the flipped signal;
   determining an overlapped region based on the virtual sliding window and the flipped signal;
   determining whether a determined number of data points in the overlapped region are smaller than a determined overlapped region threshold; and
   equating the overlapped region to the resultant region when the determined number of data points are smaller than the determined overlapped region threshold.

13. The method of claim 12, wherein selecting the resultant region further comprises:
   iteratively sliding the virtual sliding window to a subsequent position on the flipped signal; and
   iteratively determining a subsequent overlapped region based on the virtual sliding window and the subsequent position on the flipped signal.

14. A system for monitoring health of a valve, comprising:
   a sensing device operatively coupled to the valve and configured to generate an acoustic emission signal;
   a processing subsystem operationally coupled to the sensing device and configured to:
      receive an acoustic emission signal from the sensing device;
      select a region of interest signal in the acoustic emission signal, wherein the region of interest signal comprises acoustic emission data generated from initiation of an opening of the valve until the valve is partially opened, wherein the processing subsystem is configured to select the region of interest signal by:
         determining an energy signal based on the acoustic emission signal;
         determining a first derivative of the energy signal to generate a first derivative signal;
         determining a starting time stamp and an ending time stamp based on the first derivative signal; and
         selecting the region of interest signal based on the starting time stamp and the ending time stamp, wherein the region of interest signal is characterized by the starting time stamp and the ending time stamp;
      determine a plurality of current parameters based on the region of interest signal; and
      monitor the health of the valve based on at least the plurality of current parameters.

15. The system of claim 14, wherein the processing subsystem is configured to:
   receive a plurality of baseline parameters;
   determine a statistical distance metric of the plurality of current parameters from the plurality of baseline parameters; and
   monitor the health of the valve based on a comparison of the statistical distance metric and a determined statistical distance threshold.

16. The system of claim 14, wherein the processing subsystem is configured to determine the ending time stamp by:
   determining a maximum amplitude data point in the first derivative signal;
   determining a maximum amplitude time stamp corresponding to the maximum amplitude data point; and
   equating the maximum amplitude time stamp to the ending time stamp to generate the ending time stamp.

17. The system of claim 14, wherein the processing subsystem is configured to determine the starting time stamp by:
   generating a subset of the first derivative signal based on the first derivative signal and the ending time stamp;
   generating a mirror image of the subset of the first derivative signal to generate a flipped signal;
   selecting a resultant region in the flipped signal by iteratively determining overlapped regions on the flipped signal;
   identifying resultant data points in the resultant region;
   determining a resultant time stamp corresponding to one of the resultant data points; and
   equating the resultant time stamp to the starting time stamp.

18. The system of claim 17, wherein the processing subsystem is configured to select the resultant region by:
   positioning a virtual sliding window at a position on the flipped signal;
   determining an overlapped region based on the virtual sliding window and the flipped signal;
   determining whether a determined number of data points in the overlapped region are smaller than a determined overlapped region threshold; and
   equating the overlapped region to the resultant region when the determined number of data points are smaller than the determined overlapped region threshold.

* * * * *